(12) United States Patent
Dong et al.

(10) Patent No.: US 11,562,248 B2
(45) Date of Patent: Jan. 24, 2023

(54) DATA SPARSITY MONITORING DURING NEURAL NETWORK TRAINING

(71) Applicant: Advanced Micro Devices, Inc., Santa Clara, CA (US)

(72) Inventors: Shi Dong, Malden, MA (US); Daniel I. Lowell, Austin, TX (US)

(73) Assignee: Advanced Micro Devices, Inc., Santa Clara, CA (US)

(*) Notice: Subject to any disclaimer, the term of this patent is extended or adjusted under 35 U.S.C. 154(b) by 784 days.

(21) Appl. No.: 16/397,283

(22) Filed: Apr. 29, 2019

(65) Prior Publication Data

US 2020/0342327 A1 Oct. 29, 2020

(51) Int. Cl.
- *G06N 3/08* (2006.01)
- *G06F 11/34* (2006.01)
- *G06N 3/04* (2006.01)

(52) U.S. Cl.
CPC ......... *G06N 3/084* (2013.01); *G06F 11/3495* (2013.01); *G06N 3/0481* (2013.01)

(58) Field of Classification Search
None
See application file for complete search history.

(56) References Cited

U.S. PATENT DOCUMENTS

| | | | | |
|---|---|---|---|---|
| 2016/0246853 A1* | 8/2016 | Guirguis | ............ | G06F 16/2462 |
| 2018/0189056 A1* | 7/2018 | Turakhia | ............... | G06F 9/3001 |
| 2019/0081637 A1* | 3/2019 | Pool | ...................... | G06N 7/005 |
| 2019/0205358 A1* | 7/2019 | Diril | ...................... | G06F 17/16 |
| 2019/0340510 A1* | 11/2019 | Li | ......................... | G06N 3/0454 |
| 2019/0370658 A1* | 12/2019 | Xie | ........................ | G06N 3/082 |
| 2020/0225996 A1* | 7/2020 | Sharma | ................ | G06F 9/5061 |

OTHER PUBLICATIONS

S. Gray et al., GPU Kernels for Block-Sparse Weights, arXiv preprint arXiv:1711.09224, 2017.

(Continued)

*Primary Examiner* — Hal Schnee
(74) *Attorney, Agent, or Firm* — Park, Vaughan, Fleming & Dowler LLP

(57) ABSTRACT

An electronic device that includes a processor configured to execute training iterations during a training process for a neural network, each training iteration including processing a separate instance of training data through the neural network, and a sparsity monitor is described. During operation, the sparsity monitor acquires, during a monitoring interval in each of one or more monitoring periods, intermediate data output by at least some intermediate nodes of the neural network during training iterations that occur during each monitoring interval. The sparsity monitor then generates, based at least in part on the intermediate data, one or more values representing sparsity characteristics for the intermediate data. The sparsity monitor next sends, to the processor, the one or more values representing the sparsity characteristics and the processor controls one or more aspects of executing subsequent training iterations based at least in part on the values representing the sparsity characteristics.

23 Claims, 9 Drawing Sheets

(56) References Cited

OTHER PUBLICATIONS

S. Han et al., DSD: Dense-Sparse-Dense Training for Deep Neural Networks, 5th International Conference on Learning Representations, Apr. 2017, arXiv preprint arXiv: 1607.04381, 2016.
Jain, A. et al., Gist: Efficient Data Encoding for Deep Neural Network Training, ISCA '18 Proceedings of the 45th Annual International Symposium on Computer Architecture, p. 776-789, Jun. 2018.
Liu, B. et al, Sparse Convolutional Neural Networks, 2015 IEEE Conference on Computer Vision and Pattern Recognition (CVPR), IEEE, Jun. 2015.
Narang, S et al., "Block-sparse recurrent neural networks," arXiv preprint arXiv:1711.02782, 2017.
Ren, M. et al., "Sbnet: Sparse blocks network for fast inference," Proceedings of the IEEE Conference on Computer Vision and Pattern Recognition, 2018.

\* cited by examiner

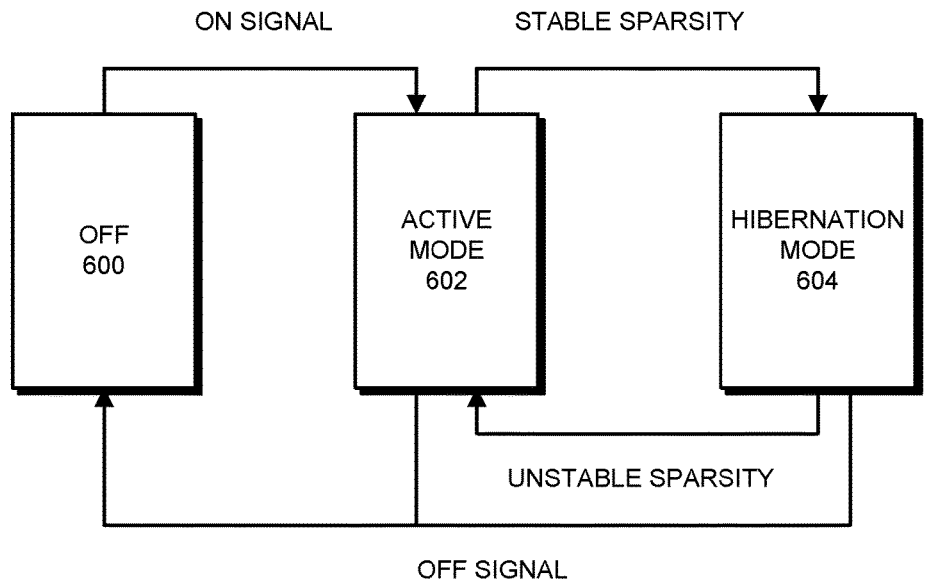

FIG. 6

```
INPUT: CURRENT_SPARSITY, ACTIVE_HISTORY_LENGTH,
ACTIVE_SPARSITY_DIFF_THRESHOLD
OUTPUT: N/A
        IF LEN(SPARSITY_HISTORY) < ACTIVE_HISTORY_LENGTH:
            # WARM UP THE SPARSITY HISTORY
            SPARSITY_HISTORY.APPEND(CURRENT_SPARSITY)
        ELSE:
            # INCREASE THE MONITORING PERIOD WHEN CERTAIN CONDITIONS ARE MEET
            IF DIFF(CURRENT_HISTORY, SPARSITY_HISTORY[0]) <
ACTIVE_SPARSITY_DIFF_THRESHOLD:
                ACTIVE_MONITORING_PERIOD = ACTIVE_MONITORING_PERIOD * 2
            IF ACTIVE_MONITORING_PERIOD > HIBERNATE_MONITORING_PERIOD:
                ACTIVE_MONITORING_PERIOD = HIBERNATE_MONITORING_PERIOD
            # UPDATE THE SPARSITY HISTORY
            UPDATE_SPARSITY_HISTORY(CURRENT_SPARSITY)
```

FIG. 7

```
INPUT: CURRENT_SPARSITY, HIBERNATE_HISTORY_LENGTH, INITIAL_SPARSITY_THRESHOLD,
HIBERNATE_SPARSITY_DIFF_THRESHOLD
OUTPUT: N/A
IF STATUS == "ACTIVE":
    HIBERNATION_READY_COUNT = 0
    # LOOP THROUGH SELECTED MONITORED DATA
    FOR I = 1 -> LEN(SELECTED_SPARSITY_INFO):
        # THE MONITORING PERIOD FOR THE DATA IS THE HIBERNATION MONITORING PERIOD AND THE DATA IS VALID
        IF SPARSITY_INFO[I].ACTIVE_MONITORING_PERIOD >= HIBERNATE_MONITORING_PERIOD AND
SPARSITY_INFO[I].VALID == TRUE:
            HIBERNATION_READY_VALID_COUNT += 1
        # OR THIS DATA IS INVALID DUE TO LOW SPARSITY
        IF SPARSITY_INFO[I].VALID == FALSE:
            HIBERNATION_READY_INVALID_COUNT += 1
    HIBERNATION_READY_COUNT = HIBERNATION_READY_VALID_COUNT + HIBERNATION_READY_INVALID_COUNT
    # MAKE THE TRANSITION TO HIBERNATE IF ALL MONITORED DATA ARE READY FOR HIBERNATION, EXCEPT WHEN IT IS AT
THE BEGINNING OF THE PROCESS WHEN ALL DATA ARE LABELED "INVALID"
    IF HIBERNATION_READY_COUNT == LEN(SELECTED_SPARSITY_INFO) AND HIBERNATION_READY_INVALID_COUNT !=
LEN(SELECTED_SPARSITY_INFO):
        TRANSIT_TO("HIBERNATE")
ELSE IF STATUS == "HIBERNATE":
    IF LEN(SPARSITY_HISTORY) < HIBERNATE_HISTORY_LENGTH:
        # WARM UP THE SPARSITY HISTORY
        SPARSITY_HISTORY.APPEND(CURRENT_SPARSITY)
    ELSE:
        # MAKE THE TRANSITION TO ACTIVE IF ANY DATA PRESENTS UNSTABLE SPARSITY TRENDS
        IF DIFF(CURRENT_HISTORY, SPARSITY_HISTORY[0]) > ACTIVE_SPARSITY_DIFF_THRESHOLD:
            RESET_MONITORING_PERIOD(INITIAL_SPARSITY_THRESHOLD)
            TRANSIT_TO("ACTIVE")
```

FIG. 8

DATA SPARSITY MONITORING DURING NEURAL NETWORK TRAINING

BACKGROUND

Related Art

Some electronic devices perform operations for artificial neural networks or, more simply, "neural networks." Generally, a neural network is a computational structure that includes internal elements having similarities to biological neural networks, such as those in a living creature's brain. Neural networks can be trained to perform specified tasks by using known instances of training data to configure the internal elements of the neural network so that the neural network can perform the specified task on unknown instances of input data. For example, one specified task performed by neural networks is identifying whether (or not) an image includes image elements such as faces or vehicles. When training a neural network to perform image identification, images that are known to include (or not) the image elements are processed through the neural network to configure the internal elements to generate appropriate outputs when subsequently processing unknown images to identify whether the image elements are present in the unknown images.

Neural networks include, in their internal elements, a set of artificial neurons, or "nodes," that are interconnected to one another in an arrangement similar to how neurons are interconnected via synapses in a living creature's brain. A basic neural network can be visualized as a form of weighted graph structure in which the nodes include input nodes, intermediate nodes, and output nodes. Within the neural network, each node other than the output nodes is connected to one or more downstream nodes via a directed edge that has an associated weight. During operation, input nodes in a first layer of the neural network receive inputs from an external source and process the inputs to produce input values. The input nodes forward the input values to intermediate nodes in the next layer of the neural network. The receiving intermediate nodes weight the received inputs based on a weight of a corresponding directed edge, i.e., adjust the received inputs such as multiplying by a weighting value, etc. Each intermediate node sums the corresponding weighted received inputs and possibly a bias value to generate an internal value and evaluates an activation function for the intermediate node using the internal value to produce a result value. The intermediate nodes then forward the result values as input values to intermediate nodes in the next layer of the neural network, where the input values are used to generate internal values and evaluate an activation function as described above. In this way, values progress through intermediate nodes in layers of the neural network until a last layer of intermediate nodes forward result values to output nodes for the neural network, which generate outputs for the neural network. Continuing the example above, the outputs produced by the output nodes—and thus from the neural network—can be in a form, e.g., a number between 0-1, that indicates whether or not an image is likely to include (or not) a specified image element.

As described above, values forwarded along directed edges between nodes in a neural network are weighted in accordance with a weight associated with each directed edge. By setting the weights associated with the directed edges during a training process so that desired outputs are generated by the neural network, the neural network can be trained to produce intended outputs such as the above-described identification of image elements in images. When training a neural network, numerous instances of training data having expected or desired outputs are processed in the neural network to produce actual outputs from the output nodes. Continuing the neural network example above, the instances of training data would include digital images that are known to include (or not) particular image elements, and thus for which the neural network is expected to produce outputs that indicate that the image element is likely present (or not) in the images. After each instance of training data is processed in the neural network to produce an actual output, an error value, or "loss," between the actual output and a corresponding expected output is calculated using mean squared error, log loss, or another algorithm. The loss is then worked backward through the neural network, or "backpropagated" through the neural network, to adjust the weights associated with the directed edges in the neural network in order to reduce the error for the instance of training data, thereby adjusting the neural network's response to that particular instance of training data—and all subsequent instances of input data. For example, one backpropagation technique involves computing a gradient of the loss with respect to the weight for each directed edge in the neural network. Each gradient is then multiplied by a training coefficient or "learning rate" to compute a weight adjustment value. The weight adjustment value is next used in calculating an updated value for the corresponding weight, e.g., added to an existing value for the corresponding weight.

For some neural networks, and particularly neural networks with larger numbers of intermediate nodes, large amounts of intermediate data can be generated as outputs from intermediate nodes. Performing the above-described computations during the training process (i.e., as instances of training data are processed through the neural network and the loss is backpropagated) therefore places a considerable computational burden on processors and other functional blocks in devices used for training neural networks. In addition, storing and retrieving the intermediate data during training process requires a large amount of memory and adds delay to the training process. Designers have therefore proposed a number of techniques for using properties of intermediate data to improve the efficiency of computations involving intermediate data and storage of intermediate data. For example, some system designers have proposed detecting zeroes in intermediate data from multiple intermediate nodes, or the "sparsity" of the intermediate data from these intermediate nodes, and using more efficient computations (e.g., sparse matrix operations) when the sparsity of the data permits the use of such computations. As another example, designers have proposed using compressed storage formats for storing intermediate data in memory based on the sparsity of the intermediate data. Unfortunately, detecting the sparsity of intermediate data during the training process is cumbersome and data intensive, which has served to limit the widespread adoption of techniques that take advantage of the sparsity of intermediate data during training iterations.

BRIEF DESCRIPTION OF THE FIGURES

FIG. 6 presents a state diagram illustrating transitions between various operating modes in a sparsity monitor in accordance with some embodiments.

FIG. 7 presents a pseudocode example of dynamically adjusting a monitoring period of a sparsity monitor in an active mode in accordance with some embodiments.

FIG. 8 presents a pseudocode example of transitioning from an active mode to a hibernation mode and vice versa in accordance with some embodiments.

Throughout the figures and the description, like reference numerals refer to the same figure elements.

DETAILED DESCRIPTION

Figure 1:
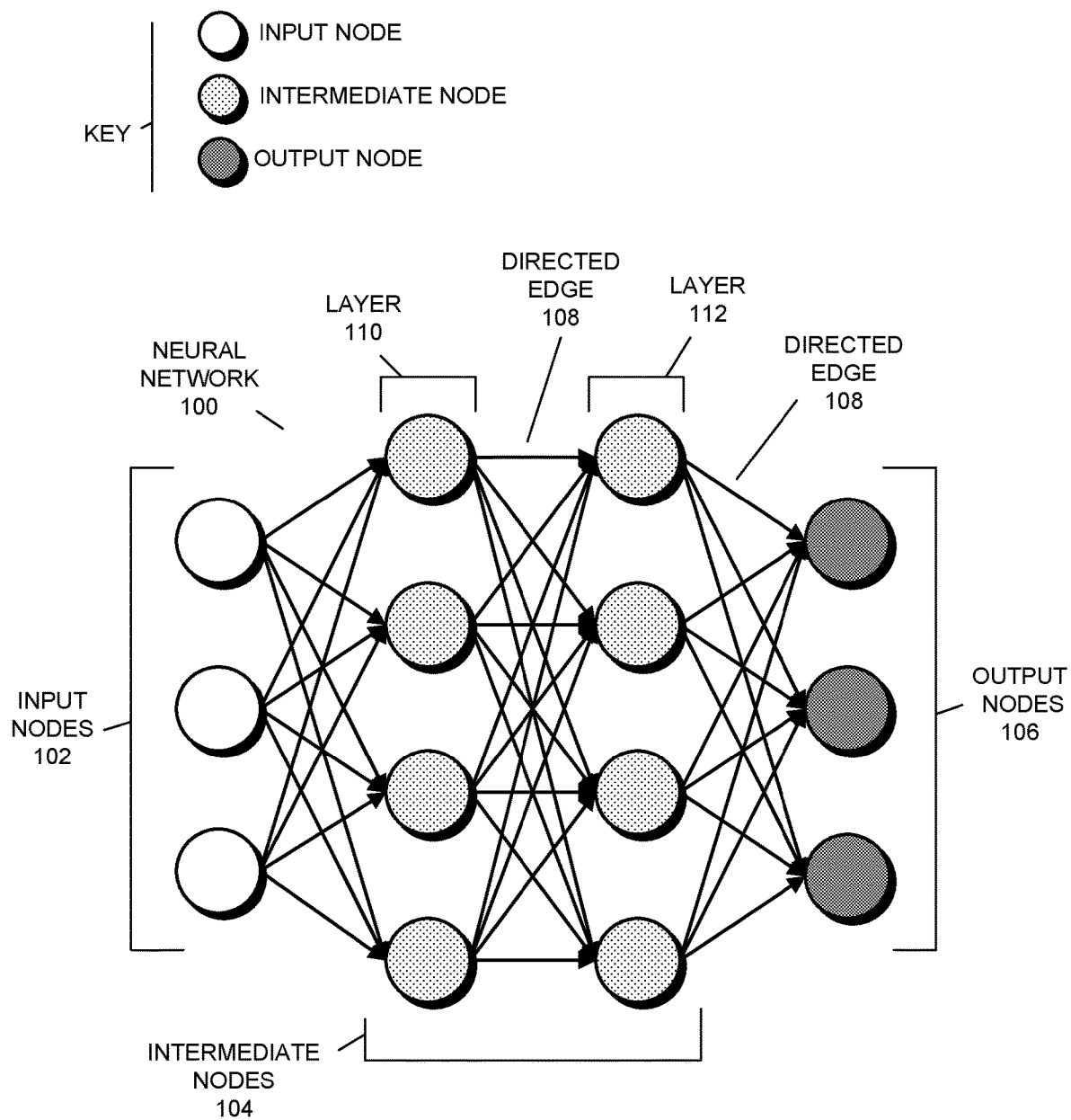
FIG. 1 presents a block diagram illustrating a neural network in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Terminology

In the following description, various terms are used for describing embodiments. The following is a simplified and general description of a few of these terms. Note that these terms may have significant additional aspects that are not recited herein for clarity and brevity and thus the description is not intended to limit the terms.

Functional block: functional block refers to a group, collection, and/or set of one or more interrelated circuit elements such as integrated circuit elements, discrete circuit elements, etc. The circuit elements are "interrelated" in that circuit elements share at least one property. For instance, the interrelated circuit elements may be included in, fabricated on, or otherwise coupled to a particular integrated circuit chip or portion thereof, may be involved in the performance of given functions (computational or processing functions, memory functions, etc.), may be controlled by a common control element and/or a common clock, etc. A functional block can include any number of circuit elements, from a single circuit element (e.g., a single integrated circuit logic gate) to millions or billions of circuit elements (e.g., an integrated circuit memory).

Sparsity: is the number and/or arrangement of zeroes (and/or other specified values) found in intermediate data output by intermediate (or "hidden") nodes in a neural network. For example, a zero may be output by an intermediate node due to the activation function (e.g., a rectified linear unit (ReLU) activation function, etc.) producing a result of zero. One simple reckoning of sparsity is a percentage. In this case, when the sparsity is determined based on zeros in intermediate data, assuming 100 intermediate nodes, a sparsity of 25% is present when 25 intermediate nodes output a zero—and the remaining 75 intermediate nodes output other values.

Training iteration: a training iteration includes some or all of the operations for processing a single instance of training data through a neural network during a neural network training process. The operations of a training iteration include processing a given instance of training data through the neural network to generate, in addition to intermediate data from intermediate nodes of the neural network, outputs from output nodes of the neural network. The operations of a training iteration may also include backpropagation of loss values associated with the given instance of training data for setting weights in the neural network, etc.

Neural Network

As described above, a neural network is a computational structure that includes internal elements (i.e., nodes and directed edges) that are trained to perform specified tasks. FIG. 1 presents a block diagram illustrating a neural network 100 including input nodes 102, intermediate nodes 104 in layers 110 and 112, output nodes 106, and directed edges 108 in accordance with some embodiments (only two directed edges and layers are labeled for clarity).

Depending on the nature of the internal elements of neural network 100, neural network 100 can be a "discriminative" network or a "generative" network. A discriminative network is a neural network that is configured to process instances of input data and output results that indicate whether specified patterns are likely to be present in the instances of input data—i.e., to classify instances of input data. For example, a discriminative network may be configured to output results indicating whether image elements such as faces or road signs are likely present in digital images, whether particular sounds or words are likely present in digital audio, etc. A generative network is a neural network that is configured to generate instances of output data that include patterns having similarity to specified patterns. For example, the generative network may be configured to generate digital images that include patterns similar to faces or road signs, audio that includes patterns similar to particular sounds or words, etc.

The described embodiments perform a training process for neural networks. During the training process, weights associated with directed edges and other values are set so that the neural network can subsequently be used for performing a specified task. In some embodiments, when training a neural network, during each of a number of training iterations, a separate instance of training data having expected or desired outputs is processed through the neural network to produce actual outputs from the output nodes. In these embodiments, after each instance of training data is processed through the neural network to produce an actual output, an error value, or "loss," between the actual output and an expected output for that instance of training data is calculated using mean squared error, log loss, or another algorithm. The loss is then worked backward through the neural network, or "backpropagated" through the neural network, to adjust the weights associated with the directed edges in the neural network in order to reduce the error for the instance of training data, thereby adjusting the neural network's response for that instance of training data—and for subsequent instances of input data. For example, in some embodiments, the backpropagation involves computing a gradient of the loss with respect to the weight for each directed edge in the neural network. Each gradient is then multiplied by a training coefficient or "learning rate" to compute a weight adjustment value. The weight adjustment value is next used in calculating an updated value for the corresponding weight, e.g., added to an existing value for the corresponding weight.

Although an example of a neural network is presented in FIG. 1, in some embodiments, a different arrangement of nodes and/or layers is present in the neural network. For example, a neural network can include a large number—and in some cases, hundreds of thousands or millions—of intermediate nodes arranged in numerous layers, each layer of intermediate nodes receiving input values and forwarding generated result values to intermediate nodes in the next layer or to output nodes. As another example, in some embodiments, a different topography or connectivity of nodes is used and/or different types of nodes are used, such as the arrangements and types of nodes used in neural networks including convolutional networks, radial basis networks, recurrent neural networks, auto encoders, Markov chains, belief networks, residual networks, etc. Generally, the described embodiments are operable with any configuration of neural network for which sparsity in intermediate data can be detected and used as described herein.

Overview

In the described embodiments, a sparsity monitor in an electronic device monitors sparsity in intermediate data output by intermediate nodes in a neural network during training iterations of a training process for the neural network. For the monitoring, the sparsity monitor acquires intermediate data output from at least some of the intermediate nodes in the neural network. The sparsity monitor then analyzes the acquired intermediate data to determine the sparsity, i.e., the intermediate data equal to zero (or another specified value). As part of the analyzing, the sparsity monitor generates values representing sparsity characteristics of the intermediate data. For example, the sparsity monitor may generate, as the values representing sparsity characteristics, values representing the current sparsity, the average or median sparsity of intermediate data from one or more intermediate nodes for a specified number of training iterations, etc. The sparsity monitor then sends, to a processor in the electronic device, the values representing the sparsity characteristics. The processor, based at least in part on the values representing the sparsity characteristics, controls one or more aspects of executing subsequent training iterations. For example, the processor may determine and configure, based on the sparsity characteristics, a type of computations performed for the subsequent training iterations, a type of compression used for compressing intermediate data for storage in a memory for subsequent training iterations, etc.

In some embodiments, the intermediate data is acquired from the intermediate nodes as described during a "monitoring interval" in a "monitoring period." For example, in some embodiments, the monitoring interval is N ms (e.g., 50 ms, 100 ms, etc.) of an M ms (e.g., 1 s, 2 s, etc.) monitoring period, with M ms>N ms. As another example, in some embodiments, the monitoring period and/or monitoring interval include a specified number of training iterations, such as the monitoring interval being K training iterations (e.g., 25, 50, etc.) and the monitoring period being Z training iterations (e.g., 500, 1000, etc.), with Z>K. In these embodiments, the monitoring interval and monitoring period may not be reckoned in terms of time (and, indeed, may be variable times, depending on how long the training iterations take). In some of these embodiments, the monitoring period and corresponding monitoring interval repeats—and may repeat as long as the training process continues. For example, an N ms (e.g., 60 ms) monitoring interval may occur every M ms (e.g., 250 ms) monitoring period, a monitoring interval of Z training iterations (e.g., 20 training iterations) may occur every X s (e.g., 2 s), etc.

In some embodiments, the sparsity monitor operates in one of a hibernation mode and an active mode. Generally, the sparsity monitor starts in the active mode and/or transitions to the active mode from the hibernation mode when the sparsity between monitoring intervals is "unstable," i.e., is changing by more than a specified amount between monitoring intervals. The sparsity monitor transitions to the hibernation mode from the active mode when the sparsity between monitoring intervals is "stable," i.e., is changing by less than the specified amount between monitoring intervals.

When the sparsity monitor commences operating in the active mode (e.g., at startup, when first monitoring sparsity during a training process for a neural network, when transitioning from the hibernation mode, etc.), the monitoring period is set at an active mode initial value for all intermediate nodes, the active mode initial value being a shortest monitoring period that is used by the sparsity monitor. The sparsity monitor then periodically determines whether the sparsity of intermediate data from corresponding training intervals is stable, and, if so, increases the length of the monitoring period (e.g., doubles or otherwise increases the length of the monitoring period). In some embodiments, the sparsity monitor monitors the sparsity in intermediate data for individual intermediate nodes and/or different groups of intermediate nodes (e.g., intermediate nodes in a layer of a neural network, a region of a neural network, etc.)—and may separately adjust monitoring periods for individual intermediate nodes and/or groups of intermediate nodes. The sparsity monitor continues to periodically determine whether the sparsity is stable and increase the length of the monitoring period for intermediate nodes in this way until the monitoring period is increased to a maximum length, i.e., a hibernation mode monitoring period (and may also incrementally decrease the monitoring period, if the sparsity is found to be unstable, back as short as the active mode initial value). In the active mode, when the monitoring period has been incremented up to the hibernation mode monitoring period for each monitored intermediate node, if the sparsity remains stable, the sparsity monitor transitions to the hibernation mode.

When the sparsity monitor is operating in the hibernation mode, the monitoring period is fixed at a hibernation mode monitoring period for all intermediate nodes—and thus the monitoring period is at its maximum length for each intermediate node. When the sparsity for a specified number of the intermediate nodes is determined to be unstable in the hibernation mode, the sparsity monitor transitions from the hibernation mode to the active mode. When transitioning to the active mode, the monitoring period is reduced to an active mode initial value and the sparsity monitor operates as described above.

In some embodiments, the sparsity monitor supports "fast" termination of monitoring of sparsity during monitoring intervals for intermediate nodes. In these embodiments, when intermediate data from one or more training iterations is found to have less than a specified sparsity (e.g., 5%, 10%, etc.), and thus the data is relatively full/does not have much sparsity, the sparsity monitor halts the acquisition and processing of intermediate data for remaining training iterations in the monitoring interval. In these embodiments, the values representing the sparsity characteristics may be generated based on intermediate data from less than all of the training iterations in an ordinary monitoring interval.

In some embodiments, the above-described values representing the sparsity characteristics for intermediate data are or include sparsity trends or patterns in the intermediate data for one or more intermediate nodes for two or more training iterations. For example, the trends may include sparsity value trends (e.g., increasing, decreasing, rate of increase or decrease, etc.) for one or more intermediate nodes across specified numbers of training iterations. As another example, the patterns may include patterns such as groupings of intermediate nodes outputting a zero (or another value), layers of intermediate nodes having more than a given number of intermediate nodes outputting a zero (or another value), a block ratio (e.g., a zero block ratio when the sparsity is based on intermediate data having the value zero), etc.

In some embodiments, the values representing the sparsity characteristics are organized into a number of "stages," akin to bins of a histogram, with each stage indicating a respective value or range of values of the sparsity characteristics. For example, in some embodiments, the stages include a first stage associated with 10%-0% sparsity (so that zero or another specified value occurs for 10% or less of the intermediate data for one or more intermediate nodes for one or more training iterations), a second stage associated with 20%-11% sparsity, a third stage associated with 30%-21% sparsity, etc. In these embodiments, the sparsity monitor may return, to the processor, a stage value (e.g., a value of 1 for the first stage, 2 for the second stage, etc.) as the value representing the sparsity characteristics.

By using the sparsity monitor to track sparsity in intermediate data output by intermediate nodes as described, the described embodiments enable a processor to control the processing of intermediate data for subsequent training iterations based on current, real-time information about the data outputs of intermediate nodes in a neural network. This can help the processor to more efficiently process instances of training data through the neural network, which can save electrical power, speed up processing operations, etc. More efficiently processing the individual instances of training data can make the training process faster and require less power, which improves the performance of the electronic device—leading to higher user satisfaction with the electronic device. In addition, by using the hibernation mode and the active mode, and the dynamically adjustable monitoring periods associated therewith, the sparsity monitor can monitor sparsity without unnecessarily burdening computational resources, communication interfaces, etc. in the electronic device.

Electronic Device

Figure 2:
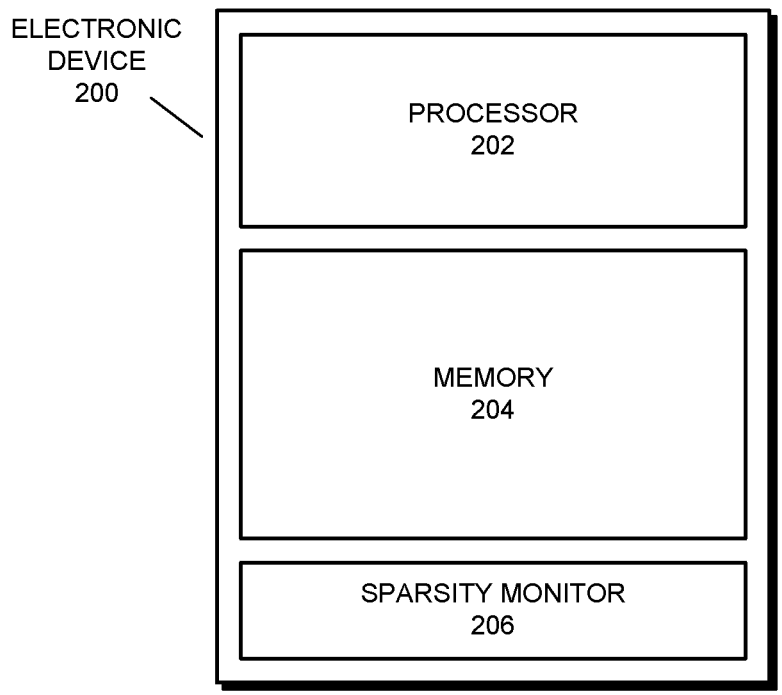
FIG. 2 presents a block diagram illustrating an electronic device in accordance with some embodiments.

In the described embodiments, an electronic device performs operations for, among other things, determining sparsity in intermediate data during training iterations of a training process for a neural network. FIG. 2 presents a block diagram illustrating an electronic device 200 in accordance with some embodiments. As can be seen in FIG. 2, electronic device 200 includes processor 202, memory 204, and sparsity monitor 206. Generally, processor 202, memory 204, and sparsity monitor 206 are implemented in hardware, i.e., using various circuit elements and devices. For example, processor 202, memory 204, and sparsity monitor 206 can be entirely fabricated on one or more semiconductor chips, including on one or more separate semiconductor chips, can be fashioned from semiconductor chips in combination with discrete circuit elements, can be fabricated from discrete circuit elements alone, etc. As described herein, some or all of processor 202, memory 204, and sparsity monitor 206 perform operations associated with determining the sparsity of intermediate data.

Processor 202 is a functional block that performs computational operations in electronic device 200. For example, processor 202 may be or include one or more central processing unit (CPU) cores, graphics processing unit (GPU) cores, application specific integrated circuits (ASICs), field programmable gate arrays (FPGAs), etc. In some embodiments, processor 202 includes circuit elements or functional blocks such as pipelines, execution units, compute units, etc. that execute program code that causes the circuit elements/functional blocks to perform associated operations. In some embodiments, processor 202 includes hardware circuits that are dedicated to—and possibly purpose-specific for—performing specified processing operations.

Memory 204 is functional block in electronic device 200 that performs operations of a memory (e.g., a "main" memory) for electronic device 200. Memory 204 includes memory circuits such as fourth-generation double data rate synchronous dynamic random access memory (DDR4 SDRAM), static random access memory (SRAM), and/or other types of memory circuits for storing data and instructions for use by functional blocks in electronic device 200 and control circuits for handling accesses of the data and instructions that are stored in the memory circuits and for performing other control or configuration operations. In some embodiments, intermediate data for training iterations of a neural network training process are stored in and retrieved from memory 204.

Sparsity monitor 206 is a functional block that performs operations for tracking, analyzing, and reporting the sparsity of intermediate data output from intermediate nodes during training iterations of a training process for a neural network. Generally, tracking the sparsity includes acquiring intermediate data for at least some intermediate nodes of the neural network and possibly generating/storing records of the sparsity. Analyzing the sparsity includes determining, based on acquired intermediate data, values representing sparsity characteristics of the sparsity, such as values representing the sparsity of the intermediate data for one or more intermediate nodes for a particular training iteration and/or values representing the sparsity for one or more intermediate nodes for a combination of two or more training iterations (e.g., an average, trend, or pattern of the sparsity). Reporting the sparsity comprises sending, to one or more other functional blocks (e.g., processor 202, etc.) the values representing sparsity characteristics of the sparsity, such as via files, messages, etc.

Figure 3:
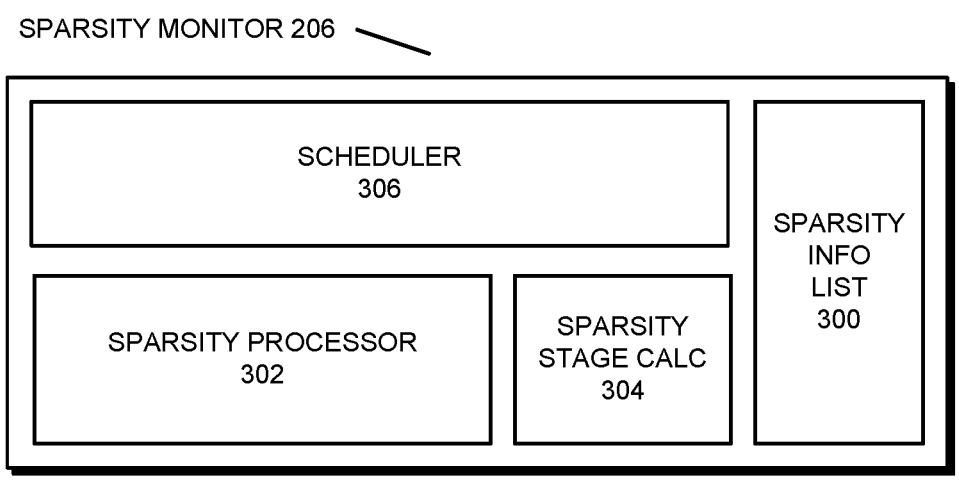
FIG. 3 presents a block diagram illustrating a sparsity monitor in accordance with some embodiments.

FIG. 3 presents a block diagram illustrating sparsity monitor 206 in accordance with some embodiments. As can be seen in FIG. 2, sparsity monitor 206 includes sparsity information (INFO) list 300, sparsity processor 302, sparsity stage calculator (CALC) 304, and scheduler 306. Sparsity information list 300 is a functional block that stores intermediate data acquired from one or more intermediate nodes in a neural network for one or more training iterations and/or values computed based on the intermediate data for one or more training iterations. For example, in some embodiments, sparsity information list 300 includes/stores the actual values of intermediate data for one or more intermediate nodes (and possibly each of a number of intermediate nodes) that were acquired from (e.g., captured or read from) the intermediate nodes during each of one or more training iterations. As another example, in some embodiments, sparsity information list 300 includes values computed or derived from the actual intermediate data, such as averages, totals, pattern identifiers, etc. of sparsity of or in the intermediate data. Sparsity information list 300 may also store metadata such as an identifier of training iteration(s), monitoring interval, and/or monitoring period when the intermediate data was acquired, identifiers of intermediate nodes from which the intermediate data was acquired, and other information for identifying sources of intermediate data and/or the sparsity therein.

Sparsity processor 302 is a functional block that performs operations for analyzing intermediate data acquired during one or more training iterations, monitoring intervals, and/or monitoring periods to determine values representing sparsity characteristics of the intermediate data. In other words, sparsity processor 302 computes or determines values representing sparsity characteristics for individual intermediate nodes and/or groups thereof (e.g., the intermediate nodes in one or more layers or regions of the neural network, etc.) for one or more training iterations, monitoring periods, and/or monitoring intervals. For example, sparsity processor 302 may determine actual sparsity (i.e., intermediate nodes that output zero and/or another value) for individual intermediate nodes and/or groups thereof. As another example, sparsity processor 302 may compute average, median, or typical values for the sparsity of intermediate data for individual intermediate nodes and/or groups thereof for one or more training iterations. As described above, sparsity processor 302 may keep, in sparsity information list 300, historical or past intermediate data and/or values computed therefrom for multiple training iterations, monitoring periods, and/or monitoring intervals that are used for computing the average, median, or typical values, as well as other values representing sparsity characteristics of the sparsity. As yet another example, sparsity processor 302 may compute or determine patterns of sparsity such as groups or areas of nodes outputting zeroes in intermediate data during one or more training iterations, monitoring periods, or monitoring intervals. As yet another example, sparsity processor 302 may compute or determine trends in sparsity for one or more intermediate nodes during two or more training iterations, monitoring periods, or monitoring intervals. As yet another example, sparsity processor 302 may compute or determine a zero block ratio in intermediate data for groups of intermediate nodes for one or more training iterations, monitoring periods, or monitoring intervals.

In addition to analyzing the intermediate data, in some embodiments, sparsity processor 302 generates outputs that include the values representing the sparsity characteristics. For example, sparsity processor 302 may generate one or more electronic files, messages, etc. that include the values representing the sparsity characteristics and/or information based thereon. In some embodiments, sparsity processor 302 communicates the outputs to one or more other functional blocks in electronic device 200 (e.g., processor 202).

Sparsity stage calculator 304 is a functional block that performs operations for computing a "stage" of the sparsity for one or more intermediate nodes for one or more training iterations, monitoring periods, and/or monitoring intervals. In some embodiments, each stage indicates a respective value or range of values of the sparsity characteristics from among a set of possible sparsity values. For example, in some embodiments, the stages include a first stage associated with 10%-0% sparsity (so that zero or another specified value occurs for 10% or less of the intermediate data for one or more intermediate nodes for one or more training iterations), a second stage associated with 20%-11% sparsity, a third stage associated with 30%-21% sparsity, etc. In these embodiments, given a set of intermediate data from one or more intermediate nodes for one or more training iterations, monitoring periods, or monitoring intervals, sparsity stage calculator 304 can compute a stage value (e.g., a value of 1 for the first stage, 2 for the second stage, etc.) as the value representing the sparsity characteristics. In some embodiments, therefore, sparsity values for training iterations, monitoring periods, or monitoring intervals can be expressed as simplified values (e.g., in a few bits), making the communication of the values representing the sparsity more efficient. In some embodiments, the number of stages used is based on a number of changes that may be made by processor 202 in processing subsequent instances of training data, such as sparse computation mechanisms/kernels, data compression versions, etc. available to processor 202.

Scheduler 306 is a functional block that performs operations for controlling when/how sparsity monitor 206 acquires and/or analyzes intermediate data. In some embodiments, scheduler 306 determines an operating mode in which sparsity monitor 206 operates. In these embodiments, when sparsity is unstable—or changing by more than a specified amount between monitoring periods or monitoring intervals—scheduler 306 can select an active mode during which the length of the monitoring period is dynamically adjusted based on the continued stability (or instability) of the sparsity. In contrast, when sparsity is stable—or changing by less than a specified amount between monitoring periods or monitoring intervals—scheduler 306 can select a hibernation mode during which the length of the monitoring period is kept at a maximum value. The active mode and hibernation mode are described in more detail below.

Although sparsity monitor 206 is shown in FIG. 3 with a particular arrangement of functional blocks, in some embodiments, sparsity monitor 206 includes a different number and/or arrangement of functional blocks. For example, in some embodiments, sparsity processor 302 includes the elements of sparsity stage calculator 304, scheduler 306, etc. Generally, sparsity monitor 206 includes sufficient functional blocks to perform the operations herein described.

Although processor 202 and sparsity monitor 206 are shown as separate in FIG. 2, in some embodiments, processor 202 includes sparsity monitor 206. For example, in some embodiments, processor 202 is a neural network accelerator, i.e., a processor designed to efficiently perform neural network operations, that includes sparsity monitor 206. Generally, in the described embodiments, any arrangement of processor 202 and/or sparsity monitor 206 can be used that perform the operations described herein.

Although sparsity monitor 206, a hardware entity, is described as performing certain operations, in some embodiments, a different entity performs the operations. For example, in some embodiments, processor 202 performs some or all of the operations attributed to sparsity monitor 206 (and the functional blocks included therein). In these embodiments, processor 202 may execute program code that causes processor 202 to perform the operations.

Although electronic device 200 is shown as including particular functional blocks and circuit elements, electronic device 200 is simplified for illustrative purposes. In some embodiments, electronic device 200 includes additional or different functional blocks, subsystems, and/or circuit elements—or is included in a device that has additional or different functional blocks, subsystems, and/or circuit elements. For example, electronic device 200 or the device may include display subsystems, power subsystems, input-output (I/O) subsystems, etc. Generally, electronic device 200 includes sufficient functional blocks, etc. to perform the operations herein described.

Electronic device 200 can be, or can be included in, any device that performs computational operations. For example, electronic device 200 can be, or can be included in, a server computer, a desktop computer, a laptop computer, a wearable computing device, a tablet computer, a piece of virtual or augmented reality equipment, a smart phone, an artificial intelligence (AI) or machine learning device, a network appliance, a toy, a piece of audio-visual equipment, a home appliance, a vehicle, etc., and/or combinations thereof.

Monitoring Periods and Monitoring Intervals

Figure 4:
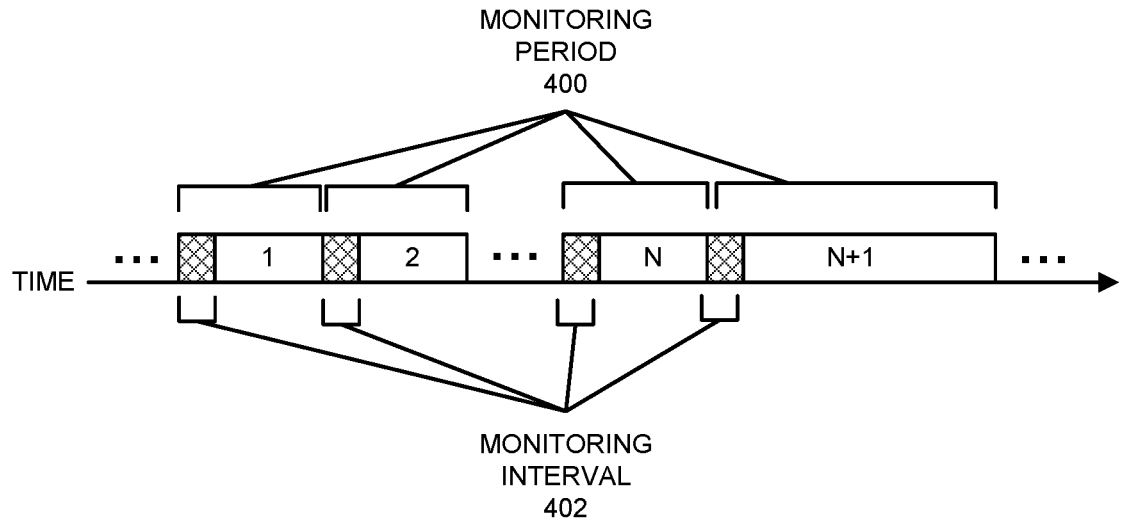
FIG. 4 presents a timeline diagram illustrating monitoring periods and monitoring intervals in accordance with some embodiments.

In the described embodiments, a sparsity monitor (e.g., sparsity monitor 206) monitors sparsity in intermediate data for training iterations for a neural network using "monitoring periods" and "monitoring intervals." FIG. 4 presents a timeline diagram illustrating monitoring periods 400 and monitoring intervals 402 in accordance with some embodiments. Scheduler 306 may use monitoring periods and monitoring intervals similar to those shown in FIG. 4 for individual intermediate nodes or groups thereof during the active mode, in which monitoring periods are dynamically adjusted based on the stability of the sparsity of intermediate data. In contrast, during the hibernation mode, monitoring periods are all of the same length for all intermediate nodes.

During each monitoring interval 402 (shown crosshatched in FIG. 4), which occurs during an "active" part of the corresponding monitoring period 400, for each of a number of training iterations that occur, scheduler 306 causes sparsity processor 302 to acquire intermediate data from one or more intermediate nodes for eventual analysis as described herein. For example, if the monitoring interval is A ms, sparsity processor 302 may acquire intermediate data from the one or more intermediate nodes for as many as B training iterations that occur in the A ms (although fast termination may end this early, as described elsewhere herein). For the remainder of monitoring period 400 (shown in white in FIG. 4), i.e., during an "idle" part of the monitoring period, scheduler 306 causes sparsity processor 302 to skip acquiring intermediate data from the intermediate nodes. In some embodiments, scheduler 306 also causes sparsity processor 302 and/or other functional blocks in sparsity monitor 206 to enter a lower power operating state during the idle part of the monitoring period to conserve electrical power, avoid generating heat, etc.

In FIG. 4, monitoring periods 400 1 through N−1 are of the same length of time and/or number of training iterations, e.g., 1 s or 250 training iterations, and monitoring intervals 402, which occur at the beginning of each monitoring period 400, are of a specified length of time and/or number of iterations, e.g., 100 ms or 50 training iterations. During monitoring periods 1 through N−1, which may follow other/past monitoring periods (not shown), sparsity processor 302 determines that the sparsity is stable and therefore that the monitoring period can be increased. For example, sparsity processor 302 can, based on intermediate data from one or more intermediate nodes for training iterations that occur during monitoring periods 1 through N−1, determine that the sparsity has changed by less than a specified amount (e.g., 5%, 10% or another value) between monitoring periods 1 through N−1 (and possibly earlier, not shown, monitoring periods)—and thus that the sparsity is stable. Scheduler 306 can therefore increase the length of the monitoring period 400 for the one or more intermediate nodes, as shown by monitoring period N. In FIG. 4, monitoring period N is approximately twice as long as monitoring periods 1 through N−1, although any increase in length, up to a maximum monitoring period value may be used.

Although particular monitoring periods 400 and monitoring intervals 402 are shown in FIG. 4, in some embodiments, different arrangements of monitoring periods and/or monitoring intervals are used. For example, monitoring intervals 402 may occur at times other than the beginning of the monitoring period 400, more than one monitoring interval 402 may occur per monitoring period 400, etc. Generally, in the described embodiments, sufficient monitoring periods 400 and monitoring intervals 402 are used to perform the operations herein described.

Flow of Data and Information

Figure 5:
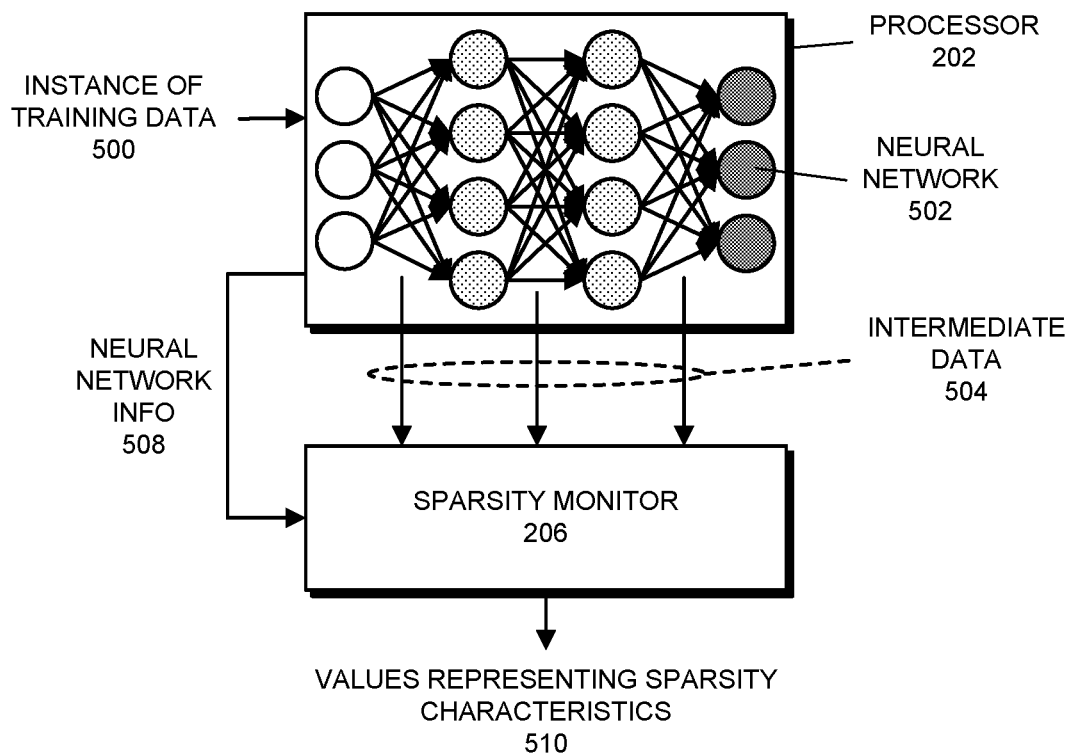
FIG. 5 presents a block diagram illustrating the flow of data and information to and from a sparsity monitor in accordance with some embodiments.

In the described embodiments, a sparsity monitor (e.g., sparsity monitor 206) receives and generates various data and information for monitoring sparsity in intermediate data. FIG. 5 presents a block diagram illustrating the flow of data and information to and from a sparsity monitor in accordance with some embodiments. Note that FIG. 5 is presented as an example of some embodiments, in other embodiments, different functional blocks receive and generate some or all of the data and information. In addition, although neural network 502 is shown in FIG. 5 using a simplified representation that is similar to the representation of neural network 100, neural network 502 may include a different arrangement and/or type of nodes, such as convolutional neural network, radial basis networks, recurrent neural networks, etc., with corresponding types and connectivity of nodes.

As can be seen in FIG. 5, processor 202 performs operations for processing instances of training data 500 through a neural network 502 during a training process for neural network 502. For example, assuming that neural network 502 classifies images as including (or not) specified image elements, processor 202 may process images (e.g., digital files including image data) through the neural network to generate outputs indicating whether the image element is present in a given image. Processing the instances of training data 500 through neural network 502 causes processor 202 to generate intermediate data 504 from or associated with one or more intermediate nodes (and possibly other nodes, e.g., input nodes) in the neural network. For example, for intermediate nodes with an activation function such as a rectified linear unit (ReLU), the processor may evaluate the activation function (i.e., compute a result of the activation function) based on corresponding weighted inputs to the intermediate nodes to generate outputs from the intermediate nodes, the outputs from the intermediate nodes serving as intermediate data from or associated with those nodes.

Intermediate data 504 is acquired by sparsity monitor 206, such as by being communicated directly from processor 202 to sparsity monitor 206 or being read from memory 204 by sparsity monitor 206 after having been stored in memory during computations by processor 202. In addition, sparsity monitor 206 acquires, from processor 202 (or another entity in electronic device 200) neural network information (INFO) 508, which is information about neural network that can be used in sparsity computations. Neural network information 508 includes information such as information about a type of neural network 502, a number, an arrangement/connectivity, and/or properties of some or all of the nodes in neural network 502, a specified task to be performed by neural network 502, a number of training iterations to be performed, what instances of training data are to be processed, etc.

Sparsity monitor 206 uses intermediate data 504 for one or more training iterations, monitoring periods, or monitoring intervals and the neural network information 508 to determine values representing the sparsity characteristics 510 for the intermediate data 504. For determining the values representing the sparsity characteristics, sparsity monitor 206 can compute values such as a present sparsity (e.g., nodes outputting zero or another value) for one or more intermediate nodes, an average, median, or typical sparsity for one or more intermediate nodes, a trend in sparsity for one or more intermediate nodes, a pattern of sparsity for one or more intermediate nodes, a zero block ratio, etc. for one or more training iterations, monitoring periods, or monitoring intervals. In some embodiments, sparsity monitor 206 determines the values representing the sparsity for specified sets of one or more intermediate nodes, such as individual intermediate nodes, intermediate nodes in a layer of the neural network, etc.

The particular values representing the sparsity characteristics determined by sparsity monitor 206 depend on the intermediate nodes and/or training iterations, monitoring periods, or monitoring intervals for which sparsity is determined. For example, in some embodiments, the values representing the sparsity characteristics 510 are numeric (such as percentages, averages, etc.), pattern identifiers, trend indicators, etc. As another example, in some embodiments, the values representing the sparsity characteristics 510 are strings, such as 0/1 strings to indicate sequences of training iterations, via 0's and 1's, when one or more intermediate nodes output zeros or other values, respectively. As another example, in some embodiments, the values representing the sparsity characteristics 510 are stages, via which corresponding ranges of sparsity are represented by one or more respective digits.

Sparsity monitor 206 can store, e.g., in memory 204 and/or in a local memory in sparsity monitor 206 (e.g., sparsity information list 300), and/or output the values representing the sparsity characteristics to one or more other functional blocks in electronic device 200. For example, in some embodiments, sparsity monitor 206 generates a file that includes the values representing the sparsity characteristics and provides the file to processor 202 (such as by storing the file in a shared memory location in memory 204). Processor 202 then controls one or more aspects of executing subsequent training iterations based at least in part on the one or more values representing the sparsity characteristics. For example, processor 202 may choose particular types of computation to be performed for subsequent training iterations (e.g., which, if any, sparse computation mechanisms/kernels and/or simplified computations are to be used), choose a compression to be used when storing intermediate data to memory 204 for subsequent training iterations, etc.

In some embodiments, processor 202 disables, powers down, or otherwise reduces a performance level (e.g., a voltage and/or a controlling clock) of at least some computational circuits and/or other functional blocks (or not) in accordance with what types of computation are in use. For example, when sparsity is higher, and thus more sparse matrix computations are to be used for subsequent training iterations, processor 202 may disable compute units, pipelines, memory interface elements, controllers, and/or other functional blocks that will not be used for performing computations.

Active Mode and Hibernation Mode

In some embodiments, a sparsity monitor (e.g., sparsity monitor 206) operates in one of an active mode and a hibernation mode when monitoring the sparsity of intermediate data during training iterations of a training process for a neural network. FIG. 6 presents a state diagram illustrating transitions between various operating modes in accordance with some embodiments. As can be seen in FIG. 6, the states in which the sparsity monitor can operate include off 600, active mode 602, and hibernation mode 604. In off 600, the sparsity monitor does not monitor sparsity in intermediate data, such as when electronic device 200 is not processing instances of training data, is shut down, and/or when the sparsity monitor is in a lower power mode (although the sparsity monitor may retain at least some functionality). The sparsity monitor transitions from off 600 to active mode 602 (or, alternatively, to hibernation mode 604 in some embodiments) upon receiving an "on" signal, such as when power is applied to the sparsity monitor, upon receiving a request from a processor (e.g., processor 202) to commence/recommence monitoring sparsity, upon detecting the processing of instances of training data/training iterations by the processor, etc. The sparsity monitor transitions from active mode 602 or hibernation mode 604 to off 600 upon receiving an "off" signal, such as when power to the sparsity monitor is shut off, upon receiving a request from a processor (e.g., processor 202) to halt monitoring sparsity, upon detecting no processing of instances of training data/training iterations by the processor, etc.

In active mode 602, the sparsity monitor monitors relatively unstable/changing sparsity, such as when intermediate data for different training iterations has or may have different levels of sparsity (i.e., different numbers or patterns of intermediate nodes producing zeroes or another value). Because the sparsity is unstable (and may be decreasing), a fixed monitoring period is less suitable for monitoring the sparsity. For this reason, in active mode 602, the sparsity monitor dynamically adjusts the monitoring period for intermediate nodes and/or groups thereof (e.g., intermediate nodes in layers of the neural network, in areas of the neural network, of specified types, etc.) based on the present sparsity and a history of sparsity for the intermediate nodes and/or the groups thereof.

FIG. 7 presents a pseudocode example of dynamically adjusting a monitoring period of a sparsity monitor in active mode 602 in accordance with some embodiments. As can be seen in FIG. 7, the sparsity monitor first generates a sufficient "history" of sparsity, i.e., a record of sparsity for one or more intermediate nodes for one or more training iterations or monitoring intervals (and, more specifically, for a specified number of training iterations or monitoring intervals). The sparsity monitor then establishes a current sparsity, or a present value for sparsity. The sparsity monitor next compares the current sparsity to a specified value of historical/past sparsity (shown in FIG. 7 as a first position in a record of historical sparsity) to determine whether the current sparsity is less than a threshold away from the historical sparsity. That is, if the sparsity has changed, between the historical sparsity and the current sparsity, by only a small amount. If so, the sparsity is stable and the monitoring period is increased by a given amount (which is shown as doubled in FIG. 7, although various increases may be used). The increase in the monitoring period is limited to a maximum of a hibernation monitoring period, which is generally the longest monitoring period used in either active mode 602 or hibernation mode 604. In other words, as long as the sparsity is relatively stable in the active mode, the sparsity monitor will periodically increase the monitoring period until the monitoring period reaches a maximum length equal to the hibernation monitoring period. In some embodiments, although not shown in FIG. 7, the monitoring period may also be decreased/shortened (e.g., cut in half, reduced by a specified amount, etc.) when the monitored sparsity is found to be unstable after the monitoring period is increased—although such decreases only occur until the monitoring period is equal to an active mode initial value (the minimum value for the monitoring period).

As described above, in some embodiments, in the active mode, the intermediate data output by individual intermediate nodes may be monitored separately by the sparsity monitor. In some of these embodiments, the monitoring period can be set at the resolution of individual intermediate nodes. In other words, different intermediate nodes may be monitored using different monitoring periods. For example, the sparsity monitor may monitor the intermediate data of a first intermediate node, or a first group of intermediate nodes, using a first monitoring period, and second intermediate node, or a second group of intermediate nodes, using a second monitoring period, and so on. This provides the sparsity monitor with fine-grained resolution for the detection of sparsity (or patterns, averages, trends, etc. in sparsity) in the intermediate nodes.

When the sparsity monitor is operating in active mode 602, upon determining, among other things, that the sparsity is relatively stable, the sparsity monitor transitions to hibernation mode 604. In hibernation mode 604, the monitoring period is not dynamically adjusted and the same monitoring period (i.e., the hibernation mode monitoring period) is used for all intermediate nodes. From hibernation mode 604, when the sparsity is relatively unstable, i.e., is changing by more than a specified amount, the sparsity monitor transitions to active mode 602.

FIG. 8 a pseudocode example of transitioning from the active mode to the hibernation mode and vice versa in accordance with some embodiments. As can be seen in FIG. 8, in the active mode, the sparsity monitor periodically loops through intermediate data to determine if each intermediate data is being monitored using the hibernation monitoring period and the data is valid, i.e., has sparsity higher than an initial sparsity threshold value (which is a value that is chosen, set, or configured, e.g., by software, by the processor, etc.). In other words, if the data is already being monitored at the slowest rate (i.e., the longest/hibernation mode monitoring period) and has sparsity that is changing by only small amounts. If so, the sparsity monitor increases the "hibernation ready valid count." The sparsity monitor also increases a "hibernation ready invalid" count when the intermediate data is marked as invalid, such as can happen when "fast" termination of monitoring was made for the intermediate data (i.e., the monitoring of the intermediate data was terminated before the end of a monitoring interval due to having lower sparsity). When all the intermediate data are ready for hibernation, i.e., the sum of hibernation ready valid count and hibernation ready invalid count are equal to the number of monitored intermediate data, the sparsity monitor transitions to hibernation mode 604. Note, however, that an initial state, i.e., when all intermediate data are marked as invalid, may not cause the transition to hibernation mode 604.

Continuing with the example in FIG. 8, from hibernation mode 604, the sparsity monitor transitions to active mode 602 when, after sufficient intermediate data are acquired, intermediate data are determined to have unstable sparsity. Part of transitioning to active mode 602 is reducing the monitoring period to an active mode initial value that is shorter than the hibernation mode monitoring period, and may be a small fraction of the hibernation mode monitoring period.

Processes for Monitoring Sparsity

Figure 9:
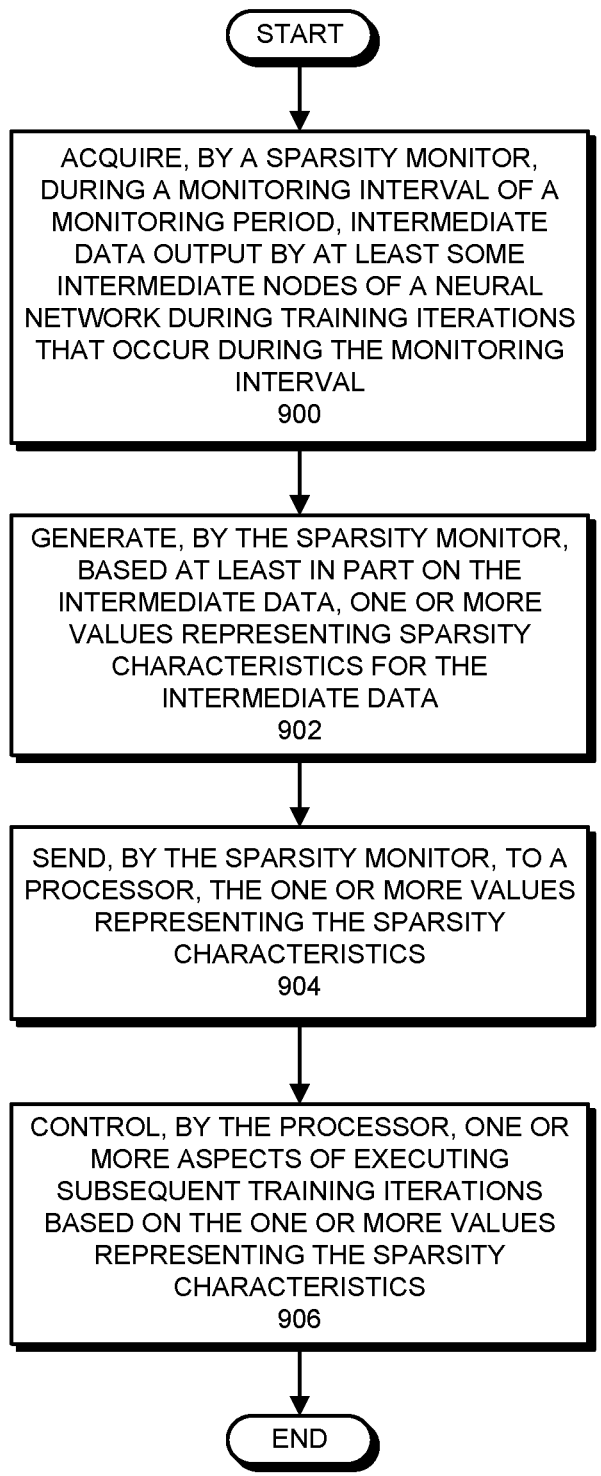
FIG. 9 presents a flowchart illustrating a process for monitoring sparsity in intermediate data during training iterations of a training process for a neural network in accordance with some embodiments.

FIG. 9 presents a flowchart illustrating a process for monitoring sparsity in intermediate data during training iterations of a training process for a neural network in accordance with some embodiments. Note that the operations shown in FIG. 9 are presented as a general example of operations performed by some embodiments. The operations performed by other embodiments include different operations, operations that are performed in a different order, and/or operations that are performed by different entities or functional blocks.

In FIG. 9, sparsity is monitored for "at least some" intermediate nodes of a neural network during the training process. The particular "at least some" of the intermediate nodes can include as few as one intermediate node and as many as all of the intermediate nodes. In some embodiments, the particular intermediate nodes that are monitored are set by a sparsity monitor (e.g., sparsity monitor 206), such as by responding to commands from an administrator, receiving requests from a processor (e.g., processor 202), executing firmware, etc. Generally, in the described embodiments, the sparsity monitor is able to monitor sparsity for individual intermediate nodes and/or groups thereof.

The operations in FIG. 9 start when a sparsity monitor acquires, during a monitoring interval of a monitoring period, intermediate data output by at least some intermediate nodes of a neural network during training iterations that occur during the monitoring interval (step 900). As described above, the intermediate data is results that are output by the intermediate (or "hidden") nodes of a neural network while processing an instance of training data, i.e., during a training iteration. How the intermediate data is acquired depends on the arrangement of the processor that generates the intermediate data. For example, in some embodiments, the intermediate data is acquired by being received (e.g., in one or more messages or communications) by the sparsity monitor from the processor. As another example, in some embodiments, the intermediate data is acquired by being retrieved by the sparsity monitor from a memory (e.g., memory 204).

The sparsity monitor then generates, based at least in part on the intermediate data, one or more values representing sparsity characteristics for the intermediate data (step 902). For example, the sparsity monitor may use the intermediate data to generate a number or percentage of zero-producing intermediate nodes as a value representing sparsity characteristics. As another example, the sparsity monitor may use the intermediate data to generate a zero block ratio or another pattern identifier for as a value representing sparsity characteristics. As another example, the sparsity monitor may use the intermediate data along with past/historical intermediate data from the at least some of the intermediate nodes to generate averages, trends, and/or other values as a value representing sparsity characteristics. Generally, for this operation, the sparsity monitor generates values that can be used by the processor and/or other entities to assess the sparsity of the intermediate data for the at least some intermediate nodes over one or more training iterations of one or more monitoring intervals.

The sparsity monitor then sends, to the processor, the one or more values representing the sparsity characteristics (step 904). For example, the sparsity monitor may generate and communicate, to the processor, one or more messages that include the values representing the sparsity characteristics. As another example, the sparsity monitor may store, in a location in memory that is shared with the processor, the one or more values representing sparsity characteristics.

The processor then controls one or more aspects of executing subsequent training iterations based on the one or more values representing the sparsity characteristics (step 906). For example, the processor may use the one or more values representing the sparsity characteristics to select computational mechanisms such as particular matrix mathematical operations to be used for the subsequent training iterations. For instance, the processor may choose to use block-sparse matrix multiplications for computing intermediate data when the values representing the sparsity characteristics indicate that sparsity is relatively high (i.e., that a larger number of intermediate nodes are generating zeros or other values). As another example, the processor may use the one or more values representing the sparsity characteristics to select data compression to be used on the intermediate data before the intermediate data is stored in memory (e.g., memory 204) for the subsequent training iterations.

Process for Using Active Mode and Hibernation Mode

Figure 10A:
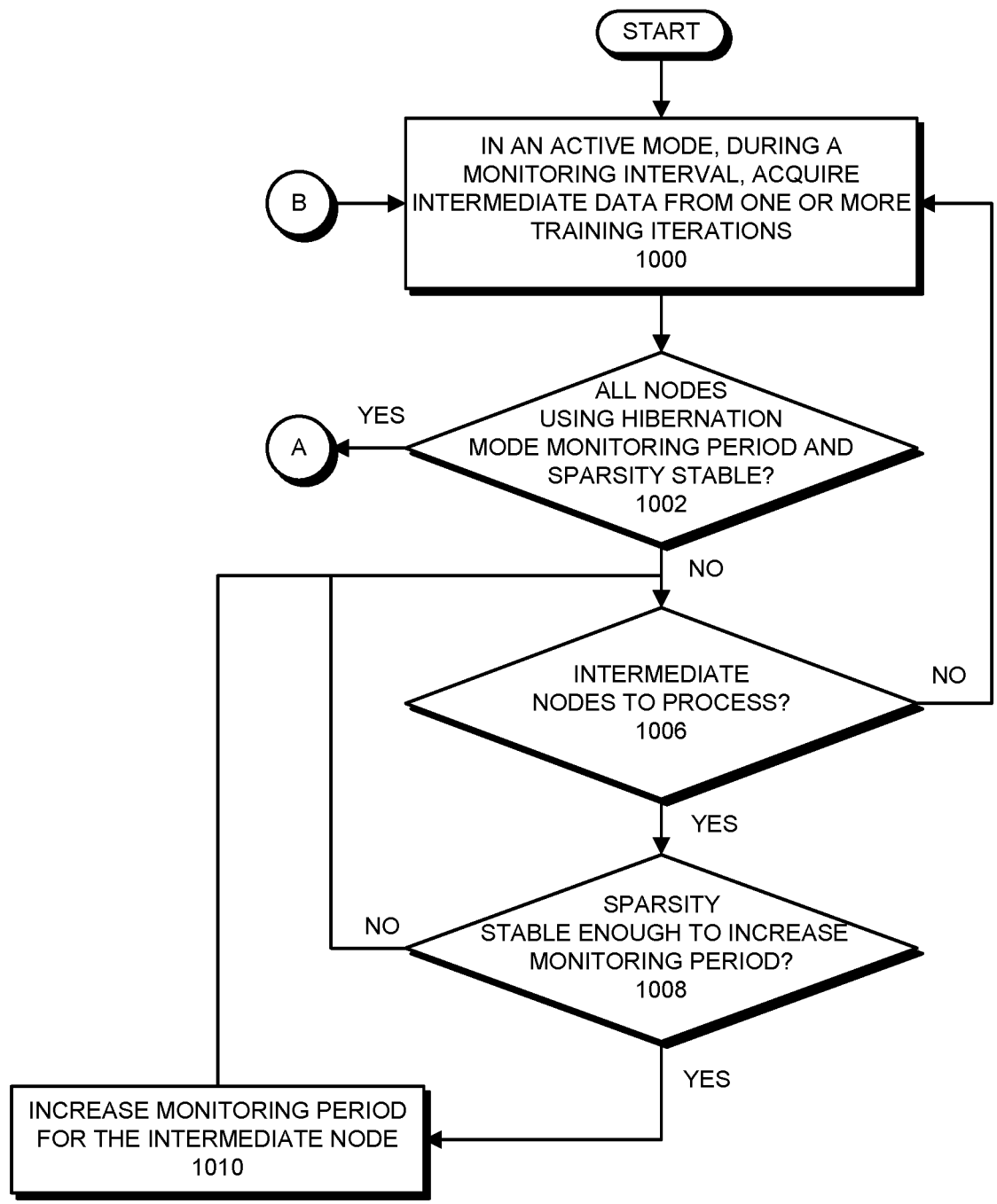
FIG. 10A presents a portion of a flowchart illustrating a process for using an active mode and a hibernation mode in a sparsity monitor in accordance with some embodiments.
Figure 10B:
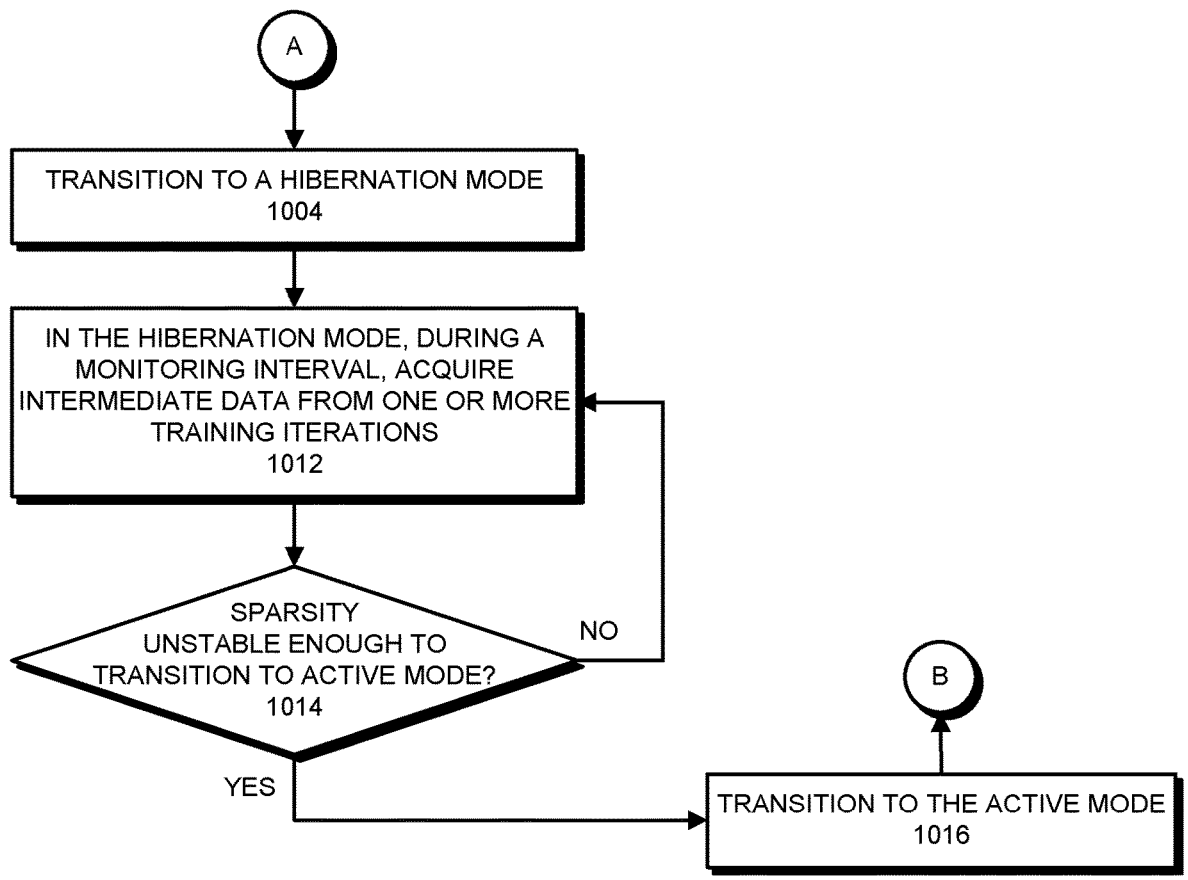
FIG. 10B presents a portion of the flowchart illustrating the process for using the active mode and the hibernation mode in the sparsity monitor in accordance with some embodiments.

FIGS. 10A-B presents flowcharts illustrating a process for using an active mode and a hibernation mode in a sparsity monitor (e.g., sparsity monitor 206) in accordance with some embodiments. Note that the operations shown in FIGS. 10A-B are presented as a general example of operations performed by some embodiments. The operations performed by other embodiments include different operations, operations that are performed in a different order, and/or operations that are performed by different entities or functional blocks.

For the operation in FIGS. 10A-B, the sparsity monitor is assumed to start in an active mode, although this is not a requirement. In some embodiments, the sparsity monitor starts in hibernation mode. As described above, and shown in FIGS. 10A-B, in the active mode, the sparsity monitor can change the length of a monitoring period for individual intermediate nodes and/or groups thereof. In the hibernation mode, however, the same fixed monitoring period is used for all intermediate nodes.

The operations in FIGS. 10A-B start when the sparsity monitor, operating in an active mode, acquires intermediate data from one or more training iterations during a monitoring interval (step 1000). For this operation, the sparsity monitor acquires, from a memory (e.g., memory 204), from a processor (e.g., processor 202), or from another source, intermediate data generated by the processor when processing one or more corresponding instances of training data through a neural network.

The sparsity monitor then determines if the sparsity monitor can transition from the active mode into a hibernation mode, which involves determining whether all intermediate nodes are being monitored using a monitoring period equal to the hibernation monitoring mode monitoring period, or a longest permitted monitoring period, and the sparsity is (and thus remains) stable (step 1002). For example, the sparsity monitor can compare a change of sparsity in each piece of intermediate data from monitoring interval to monitoring interval (or from a specified training iteration to another training iteration) to a threshold to determine if the sparsity has changed by less than a specified amount—and thus is stable. When all intermediate nodes are being monitored using a monitoring period equal to the hibernation monitoring mode monitoring period and the sparsity is sufficiently stable (step 1002), the sparsity monitor transitions to the hibernation mode (step 1004).

Otherwise, when at least some intermediate nodes are not being monitored using a monitoring period equal to the hibernation monitoring mode monitoring period or the sparsity is not sufficiently stable (step 1002), the sparsity monitor determines if the monitoring period should be increased (or possibly decreased) for each intermediate node. More specifically, for each intermediate node in turn (step 1006), the sparsity monitor determines if the sparsity for that intermediate node is stable enough to increase the monitoring period for that intermediate node (step 1008). For example, the sparsity monitor may compare, to a difference threshold, a difference between a current value representing the sparsity of that intermediate node to a historical/past value representing the sparsity of that intermediate node. If the sparsity is stable enough, the sparsity monitor increases the length of the monitoring period for that intermediate node (step 1010). For example, the sparsity monitor may double the monitoring period or add a specified amount (of time, training iterations, etc.) to the monitoring period. When increasing the monitoring period, the sparsity monitor increases the monitoring period up to the hibernation mode monitoring period, but not beyond. For example, the active mode initial value for the monitoring period may be ⅛ the length of the hibernation mode monitoring period and thus, if the monitoring period is doubled with each increase (e.g., during corresponding monitoring intervals), three separate increases are permitted before the monitoring period for an intermediate node reaches the hibernation mode monitoring period. In contrast, when the sparsity is not sufficiently stable (step 1008), the sparsity monitor leaves the monitoring period unchanged (or may decrease the monitoring period, as long as the monitoring period remains longer than an active mode initial value) and returns to step 1006 so that a next intermediate node can be processed. When the final intermediate node has been processed (step 1006), the sparsity monitor returns to step 1000 to acquire intermediate data from next training iterations.

Returning to step 1002, when all intermediate nodes are being monitored using a monitoring period equal to the hibernation monitoring mode monitoring period and the sparsity is sufficiently stable, the sparsity monitor transitions to the hibernation mode (step 1004). Recall that, in the hibernation mode, the sparsity for all intermediate nodes is monitored using the hibernation mode monitoring period. In the hibernation mode, the sparsity monitor acquires intermediate data from one or more training iterations during a monitoring interval (step 1012). For this operation, the sparsity monitor acquires, from a memory (e.g., memory 204), from a processor (e.g., processor 202), or from another source, intermediate data generated by the processor when processing one or more corresponding instances of training data through a neural network. Note that the monitoring interval in step 1012 is a different/later monitoring interval than the monitoring interval in step 1000.

The sparsity monitor then determines if the sparsity monitor can transition from the hibernation mode into the active mode, which involves determining whether the sparsity is sufficiently unstable (step 1014). For example, the sparsity monitor can compare a change of sparsity in each piece of intermediate data from monitoring interval to monitoring interval (or from a specified training iteration to another training iteration) to a threshold to determine if the sparsity has changed by more than a specified amount—and thus is unstable. When the sparsity is sufficiently unstable (step 1014), the sparsity monitor transitions to the active mode (step 1016), which involves returning to step 1000 to acquire intermediate data from next training iterations in the active mode. Otherwise, when the sparsity remains stable, the sparsity monitor returns to step 1012 to acquire intermediate data from next training iterations in the hibernation mode.

Fast Termination of Monitoring Intervals

Figure 11:
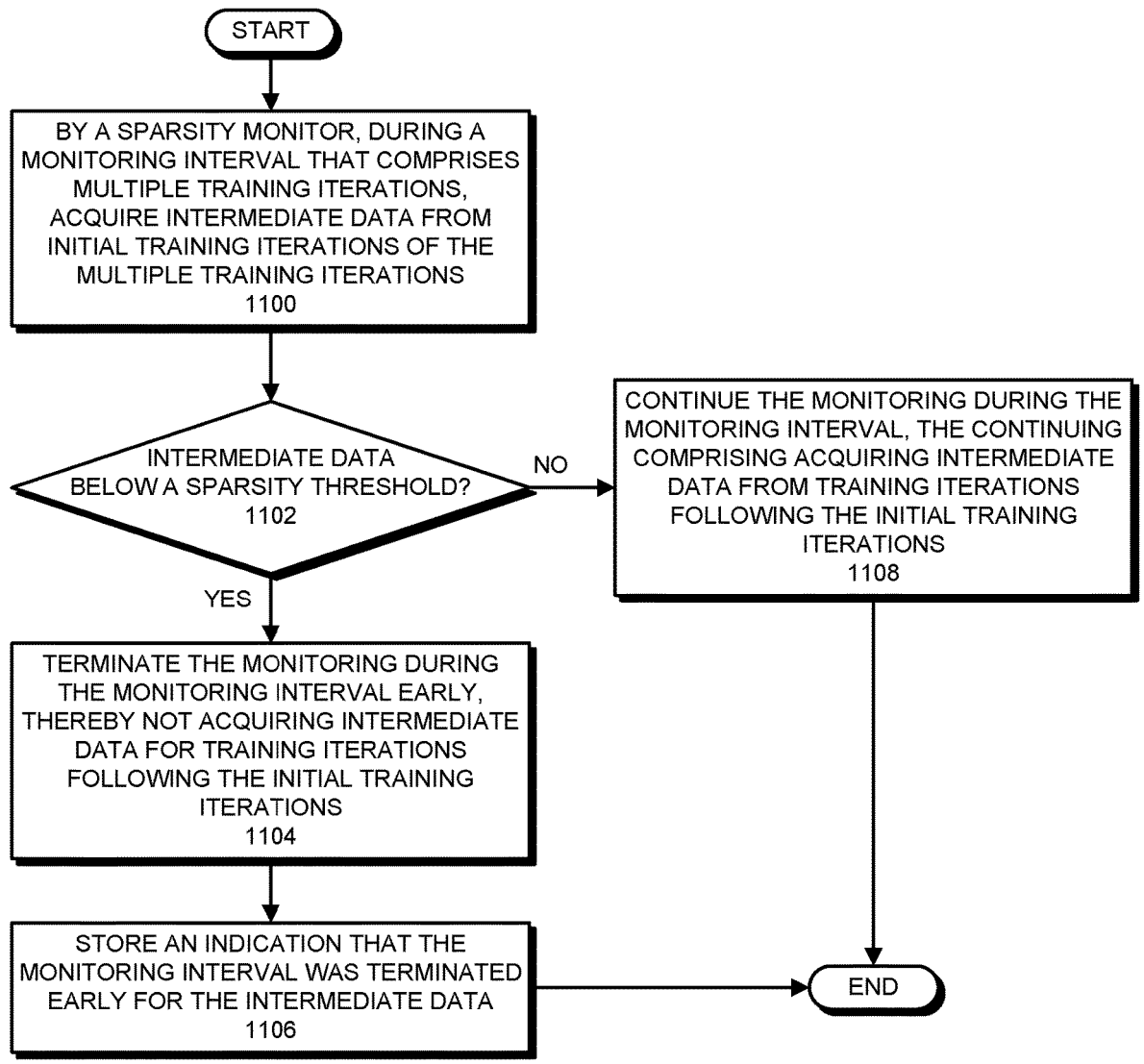
FIG. 11 presents a flowchart illustrating a process for fast termination of a monitoring interval by a sparsity monitor in accordance with some embodiments.

FIG. 11 presents a flowchart illustrating a process for fast termination of a monitoring interval by a sparsity monitor in accordance with some embodiments. Note that the operations shown in FIG. 11 are presented as a general example of operations performed by some embodiments. The operations performed by other embodiments include different operations, operations that are performed in a different order, and/or operations that are performed by different entities or functional blocks.

The process shown in FIG. 11 starts when a sparsity monitor (e.g., sparsity monitor 206), during a monitoring interval that includes multiple training iterations, acquires intermediate data from initial training iterations of the multiple training iterations (step 1100). For example, the sparsity monitor may acquire intermediate data from only a first training iteration or from a first few training iterations (from among numerous training iterations that occur during the monitoring period). Acquiring intermediate data is described elsewhere herein.

The sparsity monitor then determines if the intermediate data is below a sparsity threshold (step 1102). For example, the sparsity monitor can count up the number of intermediate nodes that output a zero as intermediate data and compute a percentage or proportion of intermediate data that is equal to zero. The sparsity monitor can then compare this percentage or proportion to a specified sparsity threshold.

When the intermediate data is below the sparsity threshold (step 1102), i.e., has only a few zeroes (or other values), so that a sparsity of the intermediate data is below the threshold (i.e., the data is relatively full), the sparsity monitor makes a fast termination of the acquisition and processing of intermediate data during the monitoring interval. More specifically, the sparsity monitor terminates the monitoring of sparsity during the monitoring interval early, thereby not acquiring intermediate data for training iterations following the initial training iterations (step 1104). By terminating monitoring in this way during the monitoring interval, the sparsity monitor avoids acquiring and processing intermediate data—and thus the power consumption, use of computational resources and communication system bandwidth, etc.—when the sparsity of the intermediate data is low (and typical/full computations and data storage techniques will be used by processor 202). The sparsity monitor also stores an indication that the monitoring interval was terminated early for the intermediate data (step 1106). For example, the sparsity monitor can mark the intermediate data as invalid to indicate that the typical acquisition and processing were not performed.

When the intermediate data is above the sparsity threshold (step 1102), and thus the data is relatively more sparse/has more zeros (or other values), the sparsity monitor continues the monitoring during the monitoring interval, the continuing comprising acquiring intermediate data from training iterations following the initial training iterations (step 1108). In this case, in other words, the sparsity monitor continues typical or ordinary sparsity monitoring—and does not use the fast termination of the monitoring interval.

In some embodiments, an electronic device (e.g., electronic device 200 and/or some portion thereof) uses code and/or data stored on a non-transitory computer-readable storage medium to perform some or all of the operations herein described. More specifically, the electronic device reads the code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., eDRAM, RAM, SRAM, DRAM, DDR4 SDRAM, etc.), read-only memory (ROM), and/or magnetic or optical storage mediums (e.g., disk drives, magnetic tape, CDs, DVDs, etc.).

In some embodiments, one or more hardware modules perform the operations herein described. For example, the hardware modules can include, but are not limited to, one or more processors/cores/central processing units (CPUs), application-specific integrated circuit (ASIC) chips, neural network processors or accelerators, field-programmable gate arrays (FPGAs), compute units, embedded processors, graphics processors (GPUs)/graphics cores, pipelines, accelerated processing units (APUs), sparsity monitors, functional blocks, and/or other programmable-logic devices. When such hardware modules are activated, the hardware modules perform some or all of the operations. In some embodiments, the hardware modules include one or more general purpose circuits that are configured by executing instructions (program code, firmware, etc.) to perform the operations.

In some embodiments, a data structure representative of some or all of the structures and mechanisms described herein (e.g., electronic device 200, sparsity monitor 206, and/or some portion thereof) is stored on a non-transitory computer-readable storage medium that includes a database or other data structure which can be read by an electronic device and used, directly or indirectly, to fabricate hardware including the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates/circuit elements from a synthesis library that represent the functionality of the hardware including the above-described structures and mechanisms. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described structures and mechanisms. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N. As used herein, despite possibly using similar letters in different locations in this description, the variables and unspecified values in each case are not necessarily the same, i.e., there may be different variable amounts and values intended for some or all of the general variables and unspecified values. In other words, N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An electronic device, comprising:
   a processor configured to execute training iterations during a training process for a neural network, each training iteration including processing a separate instance of training data through the neural network; and
   a sparsity monitor configured to:
      operate in an active mode or a hibernation mode, during which the sparsity monitor dynamically adjusts a length of a monitoring period based on sparsity characteristics for intermediate data output by at least some intermediate nodes of the neural network;
      acquire, during a monitoring interval in each of one or more monitoring periods, intermediate data output by the at least some of the intermediate nodes of the neural network during training iterations that occur during each monitoring interval;
      generate, based at least in part on the intermediate data, one or more values representing sparsity characteristics for the intermediate data; and
      send, to the processor, the one or more values representing the sparsity characteristics, the processor being configured to control one or more aspects of executing subsequent training iterations based at least in part on the one or more values representing the sparsity characteristics.

2. The electronic device of claim 1, wherein the sparsity monitor is further configured to:
   while operating in the active mode:
      determine, for each intermediate node of the at least some of the intermediate nodes, based on the one or more values representing the sparsity characteristics from two or more monitoring intervals, whether the sparsity characteristics have changed by more than an active mode threshold amount between the two or more monitoring intervals; and
      when the sparsity characteristics have not changed by more than the threshold amount, and thus the sparsity is stable, increase a length of the monitoring period for subsequent monitoring periods for that intermediate node, wherein the length of the monitoring period is increased to a maximum of a length of a hibernation mode monitoring period.

3. The electronic device of claim 2, wherein the sparsity monitor is further configured to:
   when the sparsity characteristics have changed by more than the threshold amount for an intermediate node, and thus the sparsity is unstable, retain a present length of the monitoring period or decrease the length of the monitoring period for subsequent monitoring periods for that intermediate node, wherein the length of the monitoring period is decreased to a minimum of an active mode initial value.

4. The electronic device of claim 2, wherein increasing the length of the monitoring period for subsequent monitoring periods comprises separately increasing the length of the monitoring period for individual intermediate nodes in the neural network, so that different intermediate nodes can have different monitoring periods in the active mode.

5. The electronic device of claim 2, wherein, while operating in the active mode, the sparsity monitor is further configured to:
   transition the sparsity monitor to a hibernation mode when:
      the length of the monitoring period has been increased to the length of the hibernation mode monitoring period for all of the at least some of the intermediate nodes, and
      the intermediate data output by each of the at least some of the intermediate nodes is below an intermediate data sparsity threshold;
   wherein the sparsity monitor leaves the length of the monitoring period unchanged at the length of the hibernation mode monitoring period for all intermediate nodes in the hibernation mode.

6. The electronic device of claim 5, wherein the sparsity monitor is further configured to:
   while operating in the hibernation mode:
      determine, for each intermediate node of the at least some of the intermediate nodes, based on the one or more values representing the sparsity characteristics from two or more monitoring intervals, whether the sparsity characteristics have changed by more than the active mode threshold amount between the two or more monitoring intervals; and
      when the sparsity characteristics have changed by more than the threshold amount for a specified number of intermediate nodes, and thus the sparsity is unstable, transition the sparsity monitor to the active mode, the transitioning including decreasing the length of the monitoring period to an active mode initial value that is shorter than the hibernation mode monitoring period.

7. The electronic device of claim 1, wherein the sparsity monitor is further configured to:
   when, for an intermediate node of the at least some of the intermediate nodes, one or more of the values representing the sparsity characteristics are below a sparsity threshold and thus the data is not sparse, terminate a present monitoring interval early for that intermediate node, thereby not acquiring the intermediate data output by that intermediate node during at least some of the training iterations occurring during the present monitoring interval.

8. The electronic device of claim 1, wherein generating the one or more values representing sparsity characteristics for the intermediate data comprises averaging intermediate data acquired from two or more training iterations that occur during one or more monitoring intervals.

9. The electronic device of claim 1, wherein controlling the one or more aspects of executing subsequent training iterations comprises:
when the one or more values representing the sparsity characteristics indicate higher sparsity, configuring the subsequent training iterations to use simplified computations for operations involving intermediate data.

10. The electronic device of claim 1, wherein controlling the one or more aspects of executing subsequent training iterations comprises:
when the one or more values representing the sparsity characteristics indicate higher sparsity, configuring the processor to use reduced or compressed data formats for storing the intermediate data in a memory during training iterations.

11. The electronic device of claim 1, wherein the one or more values representing the sparsity characteristics of the intermediate data comprise one or more stages selected from among a plurality of stages, each stage of the plurality of stages indicating a corresponding different portion of a range of possible sparsity values for the intermediate data.

12. The electronic device of claim 1, wherein the one or more values representing the sparsity characteristics comprise sparsity trends or patterns in the intermediate data for two or more training instances.

13. The electronic device of claim 1, wherein the one or more values representing the sparsity characteristics comprise a zero block ratio for the intermediate data for one or more training instances.

14. A method for monitoring for sparsity in intermediate data in an electronic device that includes a processor configured to execute training iterations during a training process for a neural network, each training iteration including processing a separate instance of training data through the neural network, and a sparsity monitor, the method comprising:
operating, by the sparsity monitor, in an active mode or a hibernation mode, during which the sparsity monitor dynamically adjusts a length of a monitoring period based on sparsity characteristics for intermediate data output by at least some intermediate nodes of the neural network;
acquiring, by the sparsity monitor, during a monitoring interval in each of one or more monitoring periods, intermediate data output by the at least some of the intermediate nodes of the neural network during training iterations that occur during each monitoring interval;
generating, by the sparsity monitor, based at least in part on the intermediate data, one or more values representing sparsity characteristics for the intermediate data; and
sending, by the sparsity monitor, to the processor, the one or more values representing the sparsity characteristics, the processor being configured to control one or more aspects of executing subsequent training iterations based at least in part on the one or more values representing the sparsity characteristics.

15. The method of claim 14, further comprising, by the sparsity monitor:
while operating in the active mode:
determining, for each intermediate node of the at least some of the intermediate nodes, based on the one or more values representing the sparsity characteristics from two or more monitoring intervals, whether the sparsity characteristics have changed by more than an active mode threshold amount between the two or more monitoring intervals; and
when the sparsity characteristics have not changed by more than the threshold amount, and thus the sparsity is stable, increasing a length of the monitoring period for subsequent monitoring periods for that intermediate node, wherein the length of the monitoring period is increased to a maximum of a length of a hibernation mode monitoring period.

16. The method of claim 15, wherein increasing the length of the monitoring period for subsequent monitoring periods comprises separately increasing the length of the monitoring period for individual intermediate nodes in the neural network, so that different intermediate nodes can have different monitoring periods in the active mode.

17. The method of claim 15, further comprising, by the sparsity monitor:
while operating in the active mode:
transitioning the sparsity monitor to a hibernation mode when:
the length of the monitoring period has been increased to the length of the hibernation mode monitoring period for all of the at least some of the intermediate nodes, and
the intermediate data output by each of the at least some of the intermediate nodes is below an intermediate data sparsity threshold;
wherein the sparsity monitor leaves the length of the monitoring period unchanged at the length of the hibernation mode monitoring period for all intermediate nodes.

18. The method of claim 17, further comprising, by the sparsity monitor:
while operating in the hibernation mode:
determining, for each intermediate node of the at least some of the intermediate nodes, based on the one or more values representing the sparsity characteristics from two or more monitoring intervals, whether the sparsity characteristics have changed by more than the active mode threshold amount between the two or more monitoring intervals; and
when the sparsity characteristics have changed by more than the threshold amount for a specified number of intermediate nodes, and thus the sparsity is unstable, transitioning the sparsity monitor to the active mode, the transitioning including decreasing the length of the monitoring period to an active mode initial value that is shorter than the hibernation mode monitoring period.

19. The method of claim 14, further comprising, by the sparsity monitor:
when, for an intermediate node of the at least some of the intermediate nodes, one or more of the values representing the sparsity characteristics are below a sparsity threshold and thus the data is not sparse, terminating a present monitoring interval early for that intermediate node, thereby not acquiring the intermediate data output by that intermediate node during at least some of the training iterations occurring during the present monitoring interval.

20. The method of claim 14, wherein generating the one or more values representing sparsity characteristics for the intermediate data comprises averaging intermediate data acquired from two or more training iterations that occur during one or more monitoring intervals.

21. The method of claim 14, wherein controlling the one or more aspects of executing subsequent training iterations comprises:
  when the one or more values representing the sparsity characteristics indicate higher sparsity, configuring the subsequent training iterations to use simplified computations for operations involving intermediate data.

22. The method of claim 14, wherein controlling the one or more aspects of executing subsequent training iterations comprises:
  when the one or more values representing the sparsity characteristics indicate higher sparsity, configuring the processor to use reduced or compressed data formats for storing the intermediate data in a memory during training iterations.

23. The method of claim 14, wherein the one or more values representing the sparsity characteristics of the intermediate data comprise one or more stages selected from among a plurality of stages, each stage of the plurality of stages indicating a corresponding different portion of a range of possible sparsity values for the intermediate data.

\* \* \* \* \*